US00RE42426E

(19) United States
(12) Reissued Patent
McLoughlin

(10) Patent Number: US RE42,426 E
(45) Date of Reissued Patent: Jun. 7, 2011

(54) APPARATUS AND METHOD FOR TRANSMITTING INFORMATION TO AND COMMUNICATING WITH A DOWNHOLE DEVICE

(75) Inventor: Stephen John McLoughlin, North Duffield (GB)

(73) Assignee: Halliburton Energy Services, Inc., Houston, TX (US)

(21) Appl. No.: 11/657,746

(22) PCT Filed: Apr. 27, 2000 (Under 37 CFR 1.47)

(86) PCT No.: PCT/GB00/01629

§ 371 (c)(1), (2), (4) Date: Oct. 25, 2001

(87) PCT Pub. No.: WO00/65198

PCT Pub. Date: Nov. 2, 2000

Related U.S. Patent Documents

Reissue of:
(64) Patent No.: 6,847,304
Issued: Jan. 25, 2005
Appl. No.: 10/009,700
Filed: Oct. 25, 2001

U.S. Applications:
(60) Provisional application No. 60/131,208, filed on Apr. 27, 1999.

(51) Int. Cl.
*G01V 3/00* (2006.01)

(52) U.S. Cl. ..... 340/854.3; 367/82; 175/45; 73/152.03
(58) Field of Classification Search ..... 340/854.4, 340/854.3, 853.6, 854.5; 367/82; 175/45; 73/152.03
See application file for complete search history.

(56) References Cited

U.S. PATENT DOCUMENTS

| | | | | |
|---|---|---|---|---|
| 3,967,680 | A * | 7/1976 | Jeter | 175/38 |
| 4,763,258 | A * | 8/1988 | Engelder | 340/853.3 |
| 5,332,048 | A * | 7/1994 | Underwood et al. | 175/26 |
| 5,456,316 | A * | 10/1995 | Owens et al. | 166/250.01 |
| 5,979,570 | A * | 11/1999 | McLoughlin et al. | 175/24 |
| 6,237,404 | B1 * | 5/2001 | Crary et al. | 73/152.03 |
| 6,267,185 | B1 * | 7/2001 | Mougel et al. | 175/57 |
| 6,608,565 | B1 * | 8/2003 | Van Steenwyk et al. | 340/855.4 |

* cited by examiner

*Primary Examiner* — Albert K Wong
(74) *Attorney, Agent, or Firm* — Schwegman, Lundberg & Woessner, P.A.

(57) ABSTRACT

An apparatus for use in drilling or producing from a well bore, the apparatus comprising a downhole member such as a drilling device or a production device which is capable of being attached to a tubular such as a drill string, production string or the like, means for rotating a tubular, control means for controlling the rotation of said tubular in order to transmit information along said tubular and means for monitoring the rotation of said tubular and for decoding said information transmitted along said tubular such that a magnitude of a parameter can be determined by the drilling member from the rotation or said tubular. The invention also relates to a method for communicating with a downhole tool using the apparatus.

44 Claims, 4 Drawing Sheets

APPARATUS AND METHOD FOR TRANSMITTING INFORMATION TO AND COMMUNICATING WITH A DOWNHOLE DEVICE

Matter enclosed in heavy brackets [ ] appears in the original patent but forms no part of this reissue specification; matter printed in italics indicates the additions made by reissue.

This application claims the benefit of provisional 60/131,208 filed on Apr. 27, 1999.

The present invention is concerned with the field of downhole tools. More specifically, the present invention is concerned with an apparatus and method for transmitting information to a downhole tool.

A drilling tool or member is a device suitable for drilling a well bore or the like. As the drilling tool drills further into the ground, communicating with the tool becomes more and more difficult. Other downhole tools, variously referred to as "production tools", fulfilling different functions from drilling tools yet having similar data requirements to drilling tools are considered equally within the scope of this apparatus and method.

The recognised team in the art for the method of transmitting information from the drilling tool to the surface is 'telemetry'. Telemetry can be achieved by many meats, for example, 'hardwire', where the signal is passed along a conducting medium via electrical means and to which the drilling tool is attached.

The above telemetry method requires the provision of a separate communication route for the electrical signal from the surface. This provides drawbacks in terms of both cost and potential reliability as the signal must reach the tool when the tool is many miles below the surface.

A telemetry medium for communicating with the tool should ideally be one of the parameters which is readily available in either drilling or production scenarios. A drilling parameter is a parameter which must be supplied to the drilling tool in the vast majority of drilling scenarios.

Drilling parameters such as the 'weight-on-bit', pump cycling and drill string rotation have been previously been considered. However, generally, these have been used just to toggle a switch between two states and represent, at worst a binary switching device and, at best a means of stepping through multiple options.

The drill string rotation is a drilling parameter which is common to almost all rotary drilling operations. This is typically mea ed in revolutions per minute (RPM). Variations in the rotation of the drill string can be used, be that in terms of the actual rotational velocity, the time when the drilling sting is continuously rotating at a continuous speed or a measured time when the drill string is not rotating can be used to transmit a sophisticated command sequence, wherein the rotary command parameter has magnitude. This is as opposed to the conventional toggle signal transmitted down the drill string to the drilling tool. Thus, this new apparatus and method addresses all the problems posed by known prior art.

Although the term "drill string" has been used, it will be appreciated that the "drill string" could be any tubular which is connected to a downhole tool. For example, rotation of a production string could also be used if the downhole tool is a production tool. A tubular can be any pipe or any medium which generally connects the downhole tool (when in position in the well bore) with a surface control station, providing that rotation of the tubular at the surface causes rotation of at least a part of the tubular at the downhole tool.

Therefore, in a first aspect, the present invention provides an apparatus for use in drilling or producing from a well bore, the apparatus comprising a downhole member capable of being attached to a tubular, means for rotating a tubular, control means for controlling the rotation of said tubular in order to transmit information along said tubular and means for monitoring the rotation of said tubular and for decoding said information transmitted along said tubular such that a magnitude of a parameter can be determined from the rotation of said tubular.

As previously described, the tubular may be a drill string, production string or the like. The downhole member may be a drilling tool, production tool or the like.

In a second aspect, the present invention provides a method for transmitting information along a tubular to a downhole member located within a well bore, the method comprising the steps of:

rotatably driving said tubular, wherein the rotation of said tubular is controlled in accordance with information which is to be transmitted along said tubular;

monitoring the rotation of said tubular; and analysing the monitored rotation of said tubular such that a magnitude of a parameter can be determined from the rotation of said tubular.

The variation in the tubular rotation may be provided by varying the rotational velocity or frequency of the tubular, measuring the time for continuous rotation of the tubular, measuring the time between successive rotations of the tubular (i.e. the time when the tubular is not rotating), or any of the above parameters in either separately or in combination etc.

This ability to vary the rotational speed or frequency of the tubular allows a magnitude to be communicated to the downhole member as opposed to just a binary signal. Therefore a signal, such as a magnitude of the change in a drilling angle can be communicated to the tool by using just the tubular rotation. Explicitly, the measured frequency of the tubular at the downhole member can communicate a numerical value to the drill string.

The rotation or frequency of the tubular may be monitored by the use of an emitter device which emits a signal or influences its environment such that the rotation of the drill string is used to activate a sensor means.

The emitter device which emits a signal or influences its environment may comprise a magnet. Alternatively, or in addition to the magnet, the device may also comprise a device which emits a sonic or a radioactive signal.

The emitter device may be located on the tubular or rotating part of the apparatus connected to the tubular or on a non-rotating pant of the apparatus.

The emitter device may comprise a mechanical switch which is activated by the rotation of the tubular, such that each revolution is equal to an analogue or digital data point.

The rotation of the tubular may be monitored using a sensor. The sensor may sense a field or a change in a field or signal emitted by the emitted. For example, if the emitter is a magnet then the sensor may be a Hall effect device or a magnetometer. Alternatively, the sensor may by used to sense changes in an inherently present parameter due to the rotation of the tubular. For example, the sensor may comprise an accelerometer which receives direct alternating gravitational data inputs as a direct result of the rotation of the tubular. Such a sensor would preferably sense the centre of the Earth for use in controlling a Measurement-While-Drilling, Logging-While-Drilling or similar device. The sensor regardless of its type, may be activated by the rotating tubular such that each resolution of the drill string is equal to an analogue or binary data point. The sensor may be located on the tubular, a rotating part of the app us connected to the tubular or a non rotating part of the apparatus or a non-rotating part of the apparatus depending on the location of th emitter.

Preferably, the sensor means comprises a timing device such that sensor outputs derived from the rotation of the tubular may be measured over time.

A plurality of emitters and/or sensors may be provided. If a plurality of emitter devices and/or sensor means are provided then each of the devices and/or sensor means may be actuated in an independent or sequential manner. The plurality of emitters may be located radially or axially on the rotating drill string. If the emitters are a plurality of magnets then the magnets may be aligned with alternating polarities.

The output from the sensor means may be analogue or digital. The output from the sensor means will generally be provided to a drive means or a logic means in order to control the drilling member or other device in accordance with the information transmitted down the drill string.

The sensor is preferably isolated from wellbore fluids and may be contained in a pressure housing. More preferably, the pressure housing is magnetically transparent. The output from the sensor may be utilized for triggering an activation means in the instrumentation of the downhole member or an assembly which is housed in a separate physical housing. The activation means may be logical, electronic, mechanical or physical in form. The activation means may be capable of activating multiple devices in either an independent or sequential manner. The activation means may be bi-phase, incremental or continuous in nature.

The above apparatus or method preferably uses phase shift modulation or other means of checking for errors or variances in the tubular rotation.

The apparatus and method according to the first and second aspects of the invention (respectively) may be used with any downhole device where it is necessary to transmit a control parameter to the device, for example, to control the drilling direction.

However, they are especially suited for use with a wellbore directional steering tool as described in WO-A-96/31679. The latter device is an apparatus for selectively controlling from the surface, the drilling direction of wellbore. It comprises a hollow rotatable mandrel, an inner sleeve, an outer housing, a plurality of stabilizer shoes and a drive means. The hollow rotatable mandrel has a concentric longitudinal bore. The inner sleeve is rotatably coupled about the mandrel and has an eccentric longitudinal bore of sufficient diameter to allow free relative motion between the mandrel and the inner sleeve. The outer housing is rotatably coupled around the inner eccentric sleeve and has an eccentric longitudinal bore forming a weighted side. The outer housing also has sufficient diameter to allow free relative motion between the inner sleeve. Two stabilizer shoes are longitudinally attached to or formed integrally with the outer surface of the outer housing. Finally, the drive means is arranged for selectively rotating the inner eccentric sleeve with respect to the outer housing.

An embodiment of the directional tool is shown in FIGS. 3A and 3B. It is shown in a configuration whereby it is attached to an adapter sub. 104, which can be attached to the drill string (not shown). The adapter sub is attached to the inner rotatable mandrel 111 and may not be necessary if the drill string pipe threads match the device threads. The mandrel is free to rotate within the inner eccentric sleeve 112. The mandrel 111 is capable of sustained rotation within the inner sleeve 112. The inner eccentric sleeve 112 may be turned freely within an arc, by a drive means (not shown), inside the outer eccentric housing or mandrel 113. The bearing surfaces the inner and outer mandrels are not critical as they are not in constant mutual rotation, but they must be capable of remaining clean and in relatively low torque with respect to each other in the drilling environment.

The inner rotating mandrel 111, is attached directly to a drill bit 107. However, the threads may differ between the two elements and an adapter sub may be required for matching purposes.

FIGURE B shows the relative eccentricity of the inner, 112 and outer, 113 eccentric sleeves (outer housing). The outer housing consists of a bore passing longitudinally through the outer sleeve which accepts the inner sleeve. The outer housing is eccentric on its outside, shown as the "pregnant portion", 120.

The pregnant portion or weighted side, 120 of the outer housing forms the heavy side of the outer housing and is manufactured as a part of the outer sleeve. The pregnant housing contains the drive means for controllably turning the inner eccentric sleeve within the outer housing. Additionally, the pregnant housing may contain logic circuits, power supplies, hydraulic devices, and the like which are (or may be) associated with the 'on demand' turning of the inner sleeve.

There are two stabilizer shoes, 121, on either side of the outer housing located at right angles to the pregnant housing and on the centre line drawn through the center of rotation on the inner sleeve. These two shoes serve to counter any reactionary rotation on the pan of the outer housing caused by bearing friction between the rotating mandrel 111 and the inner eccentric sleeve 112. The stabilizer shoes are normally removable and are sized to meet the wellbore diameter. The same techniques used to size a standard stabilizer can be applied in choosing the size of the stabilizer shoes. Alternatively, the shoes 121 can be formed integrally with the outer housing 113. The pregnant or weighted portion of the outer housing 113, will tend to seek the low-side of the hole and the operation of the apparatus depends On the pregnant housing being at the low-side of the hole.

The manner of functioning of the apparatus and method of the present invention to control a drilling device such as a directional drilling device as shown in Figures A and B will be described in more detail hereinbelow.

The present invention will now be described with reference to the following non-limiting preferred embodiments in which.

Figure 5A:
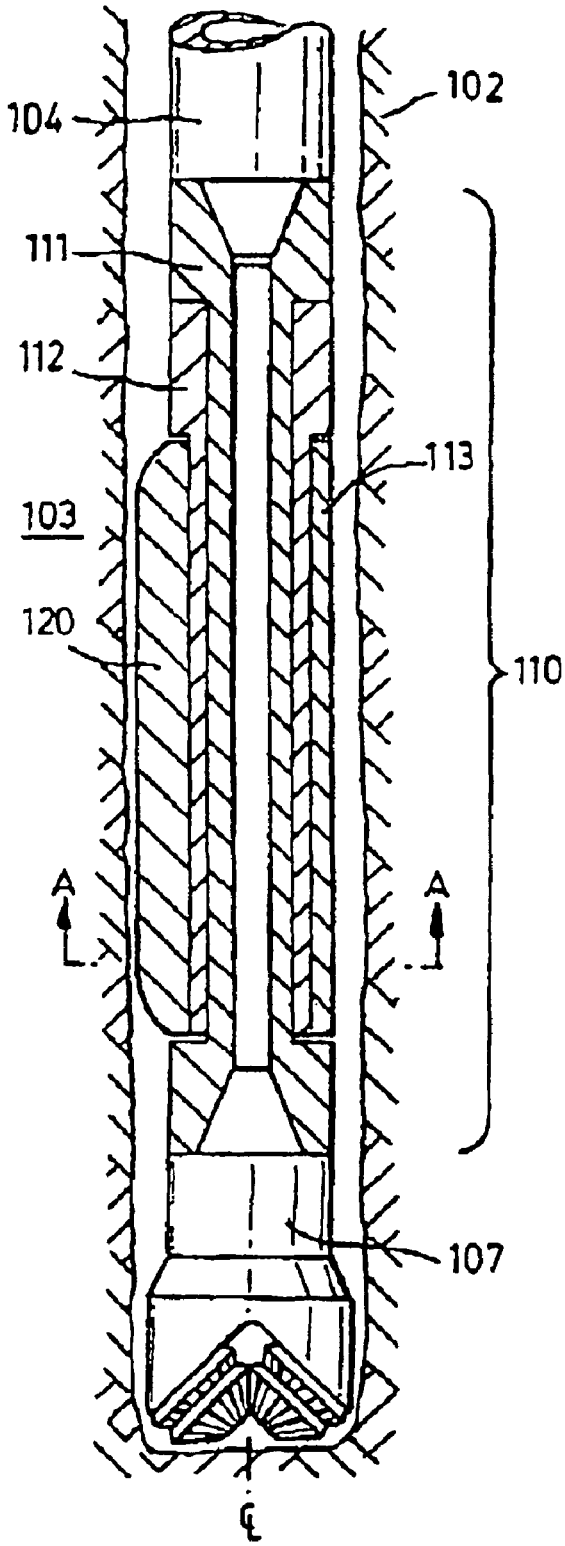

FIGS. 5A and B show a prior art drilling tool.

Figure 1:
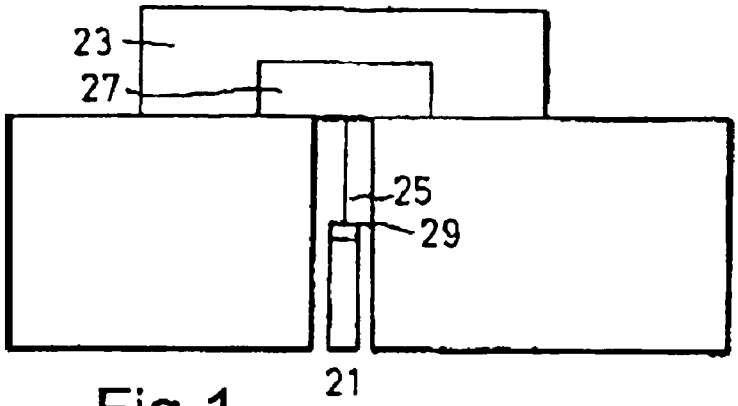
FIG. 1 shows a schematic of an embodiment of the present invention.

FIG. 1 shows a schematic of an embodiment of the present invention, the drilling tool 21 is connected to the surface station 23 via drill string 25. To effect rotational drilling, the drill string 25 is rotated.

Surface station 23 is provided with rotation control means 27 which controls the rotation of the drill string. The drilling tool 21 has monitoring means 29 which monitors the rotation of the drill string 25.

Figure 2A:
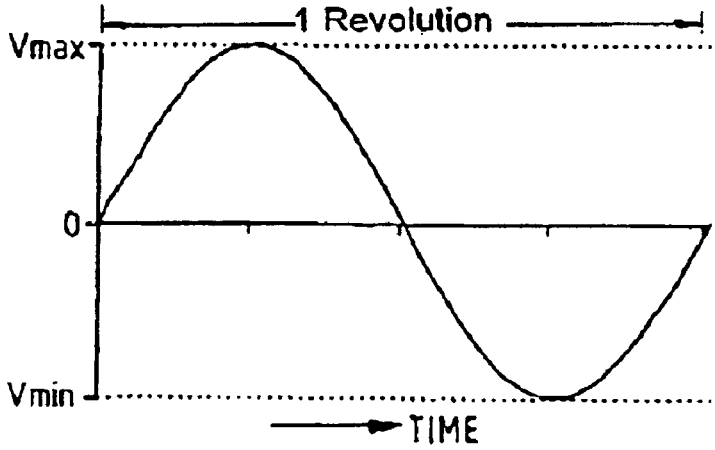
FIG. 2A shows a single cycle of a typical accelerometer output.

FIG. 2A shows the output of an accelerometer as the drill string rotates. In a single rotation of the chill string, the accelerometer output changes from a zero point to $V_{max}$, returning to zero, and passing though zero to point $V_{min}$ and then back to zero. The output of the accelerometer is generally sinusoidal with the magnitude of the maxim and the minima being $V_{max}$ and $V_{min}$ respectively. The amplitude and form of the wave is dependent on the attributes of the particular sensor being used and also the time it takes to complete a single 360° revolution.

In FIG. 2A, the accelerometer is attached to the drill string. The stating point for the single rotation is taken from where a test mass in the accelerometer is in a neutral position.

Figure 2B:
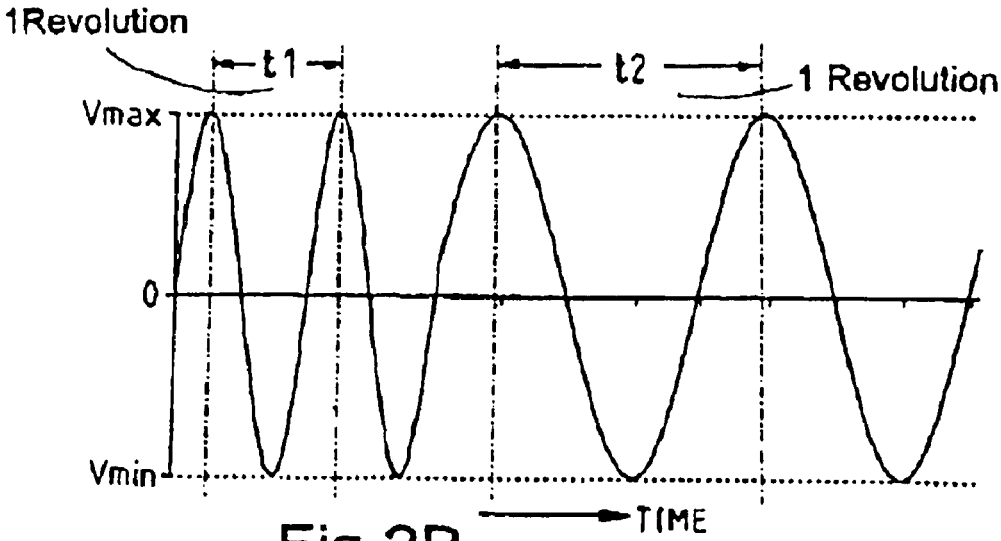
FIG. 2B shows a plot of an accelerometer output used to measure a rotating drill string with a variable rotation speed.

FIG. 2B shows an accelerometer output similar to FIG. 2A. Except, here, a number of rotation cycles of the drill string are shown and also, the rotational speed of the drill strung is varied over time. The rotational speed of the drill string is generally measured in rotations per minute or RPM.

The output of the accelerometer in FIG. 2B shows three full rotation cycles of the drill string. The dotted vertical lines on the figure indicate the start and end of each cycle. Here, each cycle starts when the accelerometer output is at maximum $V_{max}$. However, it will be appreciated that any point of the cycle could be chosen as the start point.

The first rotation cycle has a period of $t_1$. Once this cycle is completed, the speed of rotation of the drill string is reduced over the second cycle until a third cycle with a period of rotation $t_2$ is achieved. Period $t_2$ is longer than period $t_1$, therefore, the speed of rotation in the first cycle is greater than that of the third cycle. Thus, a change in the rotation speed of the drill string can be detected at the drilling member or drilling tool. Hence, the rotation frequency of the drill string can be used to instruct the drilling member, downhole device or tool.

Figure 3A:
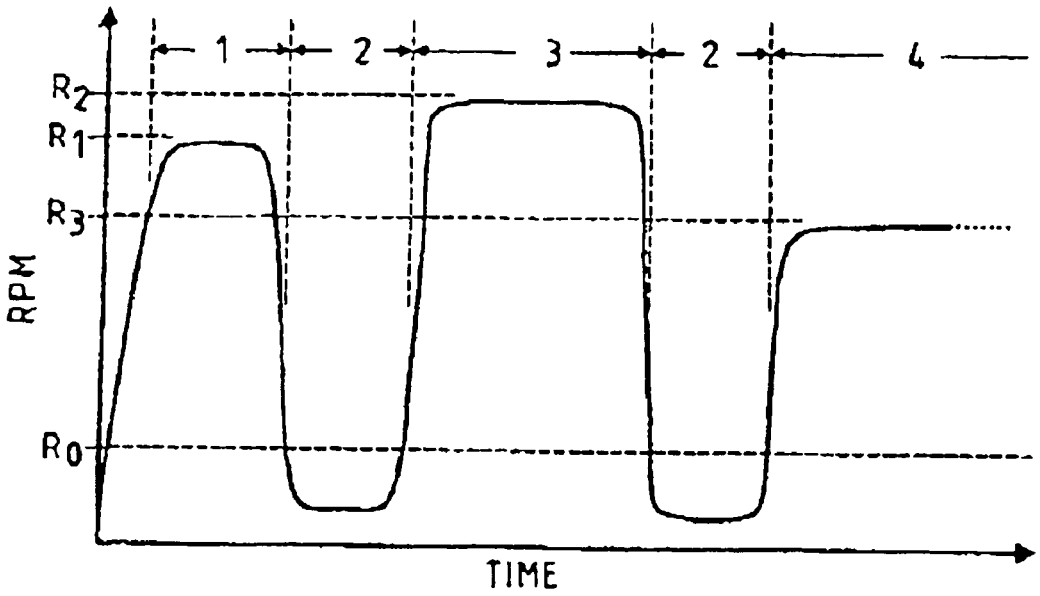
FIG. 3A shows a plot of rotation speed against time.

FIG. 3A shows a plot of the rotational velocity of the drill suing over time as the rotation velocity of the drill string is changed. Rotation of the drill string is started and the rotational velocity (or equivalently the frequency of rotation) is increased to $R_1$. The frequency is held at $R_1$ over time period [1]. When instructing a tool, this initial rotation frequency $R_1$ may be used to transfer data or information along the drill string, it may also be used to send a signal to prepare the drilling member for data transfer. This signal may transmit information to alert the drilling member that if subsequent rotation speeds follow a predetermined pattern then the intention is to transfer data to the drilling member. Also, this data set can be used to set a particular parameter which is going to be transmitted along the drill string. It should be noted that the length of period [1] as well as the frequency of rotation is itself a variable parameter which can be used to send information. Using combinatorial data transmission wherein timing and frequency variables have pre-set limits reduces the possibility of operator errors and accidental actuations may be avoided.

After time period [1], the rotation of the drill string is either reduced to zero or is reduced below a threshold value for time period [2]. The threshold value is $R_0$. Time period [2] is primarily used to create a clear distinction between instructions.

The frequency of rotation of the drill string is then increased to $R_2$ for time period [3]. This variation in the rotation frequency represents an easily identifiable codification as it varies both in rotational frequency and duration from time period [1]. The duration of time period [3] is restricted once again by reducing the rotational frequency to below threshold value R0 for a second time period [2]. After the second time period [2] the rotation frequency is increased to $R_3$ for time period [4]. Rotational frequency $R_3$ is lower than that of $R_1$ and $R_2$. Time period [4] can be used as a separate data set or it can be used as supplemental data set to that transmitted in im period [3]. It may also be used as a preamble to a following data set (in a similar manner to the data set of period [1]) or it may be used as a terminating data set which may return the parameters of the tool to an equilibrium position.

FIG. 3A shows that the present invention may be used to transmit codification which is linear, progressive and discrete: each data set may be sequential and may be separated from a the last data set by a period of zero or low frequency data. Each data set is dependent on the speed or frequency of rotation of the drill string during a pre-determined time period for its numeric value.

There are thus two data variables in each data set i.e. frequency and duration, which may be controlled from the surface. To summarise, these two variables may be used in a number if different ways in order to talk to the tool. The tool may have a number of different parameters which require instructions from the surface. The parameter which is to be changed may be set by the measured velocity or frequency of rotation and the amount which the parameter is to be changed by may be set by the duration of the signal. Alternatively, the parameter may be chosen by a preparatory data sequence (e.g. period [1] and the magnitude of the parameter may be communicated by the magnitude of the following velocity or frequency signal.

Averaging, standard code correction techniques, or other statistical means may be employed to improve the quality of the data obtained from each individual data set. Any number of data sets may be sequentially added in order to increase the quantity of data transmitted to the downhole instrumentation or mechanism(s).

Figure 3B:
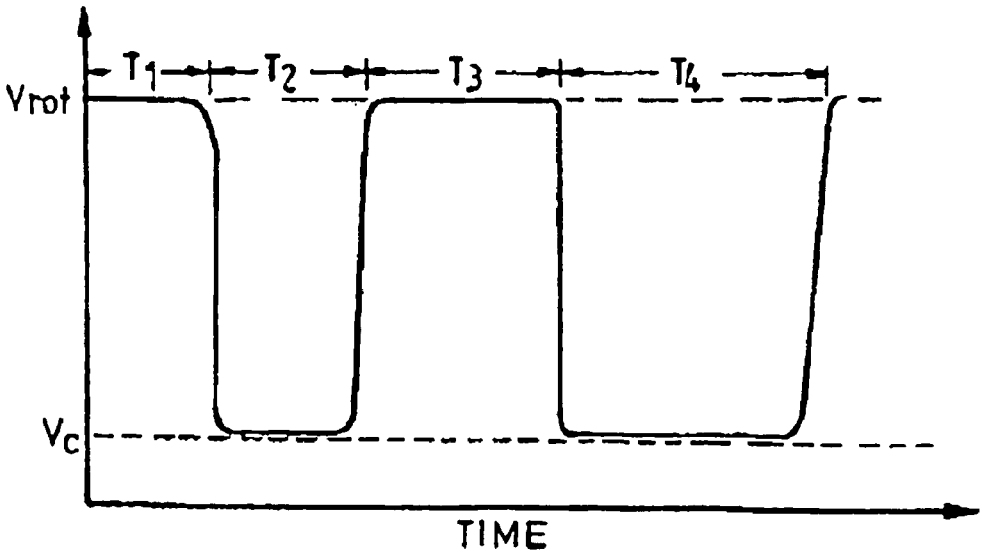
FIG. 3B shows a plot of rotation speed against time, where the drillstring is switched between rotating at a fixed speed and zero rotation.

FIG. 3B shows a plot of rotation against speed similar to FIG. 3A. In FIG. 2B, the string is switched between a constant rotating speed $V_{rot}$ and not rotating. In other words, there is only one variable which is duration as the rotational velocity which is related to the frequency is maintained constant. FIG. 3B shows a simplification of the transmission method described with relation to FIG. 3A.

As in FIG. 3A, four time periods are shown in FIG. 3B, in period 1, the drill string rotates at $V_{rot}$, the logic means of the drilling member are configured to read rotation at $V_{rot}$ as being an equilibrium stage where all logic parameters within the drill string are kept at their equilibrium values.

Figure 5B:
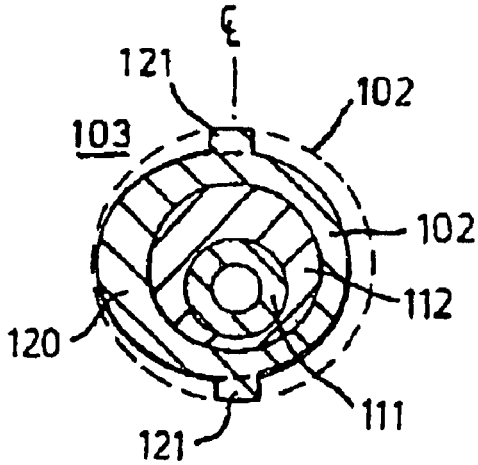

In period 2, the rotation of the drill string is stopped, the logic means of the drilling member vary a set parameter. For example, if the drilling direction of the drilling member is governed by the angular movement of a component of the drilling member (for example, 112 in FIG. 5B), then the logic means may command the angular movement of the component for the whole of period 2.

When the drill string rotation is restarted, at the start of period 3, the movement of the component is stopped.

The movement of the component arts again at the start of period 4. (i.e. when the drill string rotation stops). Period 4 is twice as long as period 2. Therefore the component moves through twice the angle in period 4 as period 2.

Hence the duration of the period of non-rotation is converted into the angle of rotation for component 112.

Figure 4A:
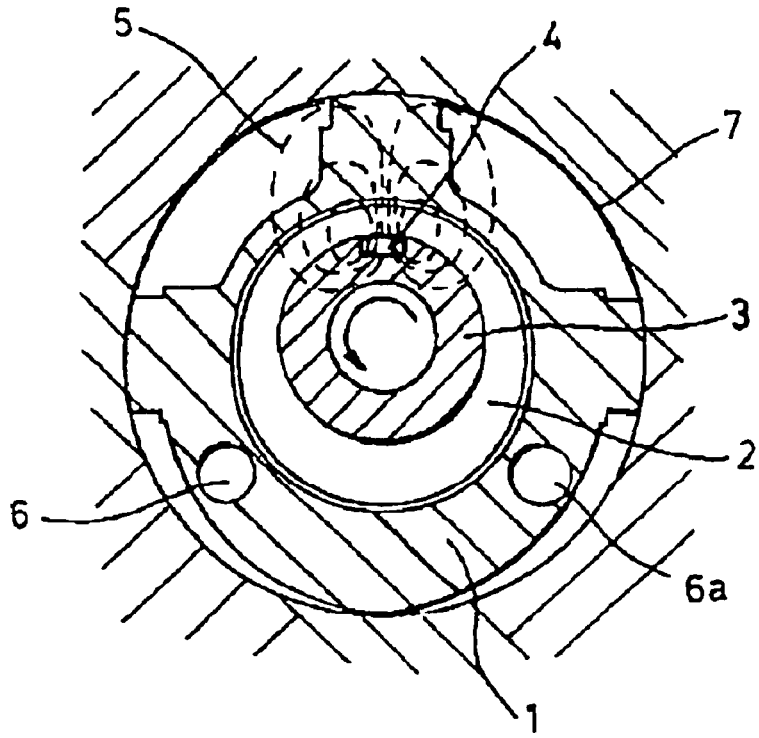
FIG. 4A shows a cross section of a drilling tool in accordance with an embodiment of the present invention.

FIG. 4A shows a cross section of a down hole tool which may be used in accordance with an embodiment of the present invention. The actual tool shown in FIG. 4A is a modified version of the inventor's own prior art which is described in relation to FIGS. 5A and 5B.

The tool comprises a outer housing 1 with an eccentric bore. An inner sleeve 2 is located within said bore such that the outer housing 1 is rotatably coupled about said inner sleeve 2. The inner sleeve 2 also has an eccentric bore which is configured to accommodate a rotating drill string member 3 such that said inner sleeve 2 can rotate relative to both said outer housing 1 and aid drill string member 3.

A magnet 4 is attached to said rotating member 3. The magnet is located in a pocket on said rotating member 3, the magnet may also be attached by some other means, for example, by adhesives. This specific embodiment uses the magnet as an emitter. However, it will be appreciated by those skilled in the art that the magnet could be replaced by any type of emitting sensor.

The outer housing 1 contains instrument barrels 6. The instrument barrels 6 are provided with sensing means. During drilling of the well bore 7, the heavy portion of the outer housing seeks the low side of the well bore and the position of the outer housing remains relatively fixed with respect to the well bore. The drill string 3 and magnet 4 rotate relative to the outer housing. Lines of flux 5 radiate from the magnet 4 in such a manner as to overcome the Earth's ambient field. The field should also be set high enough to compensate for the reduction in field strength over distance. The flux lines 5 extend radially beyond the instrument barrel 6 such that sensors within the instrument barrel 6 can detect the intensity of the emitted magnetic field. It should also be noted that the magnetic field strength should also be calculated giving due consideration to the differences in magnetic field strength of the Earth at extreme Northerly and Southerly latitudes.

When the magnet 4 is rotated such that it is closest to the sensors in the instrument barrel 6, then a maximum in the magnetic field is detected. When the magnet 4 is furthest form the instrument barrel 6, then a minimum in the magnetic field is detected. The filed detected by the sensors may be sinusoidal if is possible to sense the radiated magnetic field at all times when the member 3 is rotating. However, as it is only necessary to measure the frequency of rotation of the member, it is adequate if the sensor is just configured to detect a maxima in the field when the magnet is at its closest to the sensor. In other words, the sensor just needs to detect a series of pulses where each pulse is equivalent to one each rotation of the member 3.

Thresholds may also be set which negate the effect of the Earth's magnetic field and which serve as limit switches. These limit switches may be employed as a means of logic control within the sensor array or within a logic control sub assembly.

A second instrument barrel 6a is also shown. This may also contain magnetic sensors. The provisions of two magnetic sensors allows the direction of the rotation of the drill string to be accurately determined as well as its magnitude.

The sensor which isolated within the instrument barrel is preferably situated in a stainless steel, or another magnetically transparent pressure vessel such that the instrumentation is isolated from the borehole pressure. The instrumentation barrel may comprises a magnetometer, or Hall effect device or the like for detecting the magnetic field.

Inevitably, there will be material between the magnetic sensor in the instrument barrel 6 and the magnet 4 located on the rotating member. This intervening material should, as far as possible, be magnetically transparent. In other words, the magnetic field should pass through this material without becoming deflected or distorted. Materials which exhibit these properties include austenic stainless steels and other non-ferrous material.

Figure 4B:
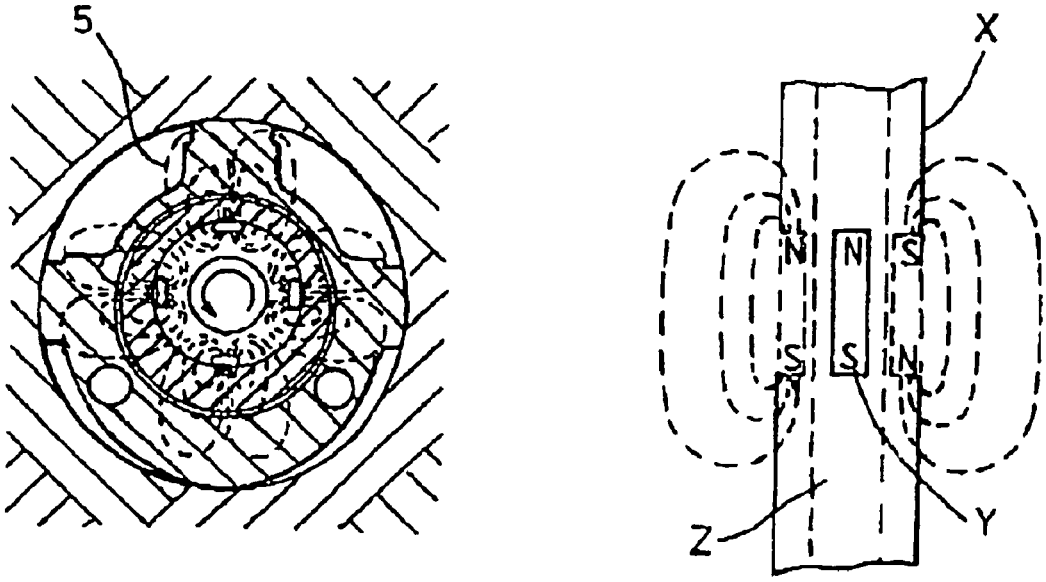
FIG. 4B shows a cross section of a drilling tool in accordance with another embodiment of the present invention.

FIG. 4B shows 3 variation on the device of FIG. 4A, In FIG. 4B the rotating drill string is provided with four magnets 4 arranged at 90° to one another. In the figure the magnets 4 are embedded within the outer rotating wall of the member 3. However, it should be noted that the magnets could be embedded in the inner rotating wall of the member 3.

More sophisticated coding is achievable with more than one emitter. Further, the inversion of one of the sensors can be used to provide error checking or other programming advantages to the present invention. Multiple magnets may also be used to increase the frequency of the signal from the rotating member 3 or for actuation of multiple sensors within a single data set time frame, for example, as a means of compressing data.

Multiple magnets may have the same polarity or they may have alternating alignment of polarity. In FIG. 4B, the magnets 4 are arranged across the same section of the tubular. However, it will be appreciated that the magnets could be arranged at various axial spacings along the member 3.

Although not shown in either of FIG. 4A or 4B, the downhole device will have analysis means to analyse the information sent along the drill string. If the information which is sent along the drill string requires mechanical movement of a component of the drilling tool or member, then drive means are required to move the required component are instructed. For example, the drive means may move a component either radially or axially in the drilling tool. In addition to mechanical information, the drilling tool may also require instructions which are essentially electronic in nature. For example, information relating to the preferred rate of data transmission may be sent along the drill string.

In both the generalised and preferred embodiments of the assembly, it should be understood the different signalling means may be employed, that different configurations my be used and that other modifications may be made without departing from the spirit and scope of the present invention as defined by the appended claims.

What is claimed is:

1. An apparatus for the use of drilling or producing from a well bore, the apparatus comprising:

a downhole member having a non-rotating part and having a rotating part freely rotating within said non-rotating part and capable of being attached to a tubular, means for rotating the tubular, control means for controlling the rotation of said tubular in order to transmit information along said tubular, means for monitoring the rotation of said tubular with respect to said non-rotating part, and means for decoding said information transmitted along said tubular said means configured to determine a magnitude of a parameter from the rotation of said tubular, such that each complete revolution of the tubular is equal to an analogue or binary data point.

2. The apparatus of claim 1, wherein the control means is configured to control the rotational velocity or frequency of the tubular.

3. The apparatus of claim 1, wherein the control means is configured to stop the rotation of the tubular for a predetermined time.

4. The apparatus of claim 3, wherein the monitoring means is configured to measure the time of non-rotation of the tubular.

5. The apparatus of claim 3, wherein the monitoring means is configured to measure the time over which the tubular is continuously rotating.

6. The apparatus of claim 5, wherein the monitoring means is configured to measure the time over which the tubular is continuously rotating at a particular rotational speed.

7. The apparatus of claim 1, wherein the monitoring means is configured to count the number of rotations of the tubular.

8. The apparatus of claim 1, wherein the monitoring means comprises a magnet.

9. The apparatus of claim 1, wherein the monitoring means comprises at least one of a radioactive or sonic source.

10. The apparatus of claim 1, wherein the monitoring means comprises a magnet and said decoding means is configured to detect a maxima in the magnetic field of the magnet so that said analogue or binary data point corresponds to a detected maxima.

11. The apparatus of claim 1, wherein said rotating part comprises:

a hollow rotatable mandrel having a concentric longitudinal bore;

an inner sleeve rotatably coupled about said mandrel, said inner sleeve having an eccentric longitudinal bore of sufficient diameter to allow free relative motion between said mandrel and said inner sleeve;

and wherein said non-rotating part comprises:

an outer housing having an outer surface, said outer housing is rotatably coupled around said inner eccentric sleeve, said outer housing having an eccentric longitudinal bore forming a weighted side adapted to automatically seek the low side of the wellbore and having sufficient diameter to allow free relative motion between said inner sleeve;

a plurality of stabilizer shoes longitudinally attached to or formed integrally with said outer surface of said outer housing;

drive means for selectively rotating said inner eccentric sleeve with respect to said outer housing and logic means for controlling said drive means based on the information transmitted along said drill string.

12. An apparatus for transmitting information in a timely manner from the face of the Earth to a downhole assembly, whereby the rotation of the drill string is used as an output device, conveying information to components which are located in the wellbore, the apparatus comprising:

a downhole member having a non-rotating sub-assembly and having a rotating sub-assembly freely rotating within said non-rotating sub-assembly and capable of being attached to the drill string, a device which is closely coupled to either said rotating sub-assembly, or a said non-rotating sub assembly, which emits a signal or influences its environment such that the rotation of the drill string is used to activate a sensor means which may be integrated into either the drill string, or a non-rotating sub-assembly with a timing device such that the sensor outputs derived from the rotation of the drill string system may be measured against a time-based system such that meaningful encoding may be accomplished, which may be coupled to an actuation or switching mechanism or mechanisms.

13. The apparatus of claim 12, wherein the emitter or device influencing the environment comprises a magnet or a magnetic device.

14. The apparatus of claim 12, wherein the emitter or device influencing the environment comprises a mechanical switch which is activated by the rotation of the drill string.

15. The apparatus of claim 12, wherein the emitter or device influencing the environment comprises at least one of a sonic or radioactive source.

16. A method of transmitting information along a tubular to a downhole member located within a well bore, the method comprising [the steps of]:

rotatably driving said tubular *attached to a downhole member having a rotating sub-assembly rotating within a non-rotating sub-assembly*, wherein the rotation of said tubular is controlled accordance with information which is to be transmitted along said tubular;

monitoring the rotation of said tubular;

detecting complete revolutions of said tubular; and analysing the monitored rotation of said tubular such that a magnitude of a parameter can be determined from the rotation of said tubular.

17. The method of claim 16, wherein the [step of] monitoring *of* the rotation of said tubular comprises [the step of] monitoring the rotational velocity of the tubular.

18. The method of claim 16, wherein the [step of] monitoring *of* the rotation of the tubular comprises [the step of] timing a period of non-rotation of the tubular.

19. The method of claim 16, wherein the [step of] driving *of* the tubular comprises [the step] stopping the rotation of the tubular for a pre-determined time determined by the information which is to be transmitted along the tubular.

20. The method of claim 16, wherein the [step of] monitoring *of* the rotation of the tubular comprises [the step of] measuring the time over which the tubular is continuously rotating at a particular frequency.

*21. An apparatus comprising:*

*a downhole tool that includes,*

*a non-rotating part;*

*a rotating part coupled to a tubular, wherein a control means at a surface of the Earth is coupled to the tubular to transmit information from the surface to downhole based on variation of a speed of rotation of the tubular from a first speed to a second speed, wherein the first speed and the second speed are non-zero; and*

*a sensor positioned on at least one of the non-rotating part and the rotating part, the sensor to monitor the speed of rotation.*

*22. The apparatus of claim 21, wherein the downhole tool further comprises an analysis means coupled to the sensor, the analysis means to decode the information from the surface that is received by the sensor based on the first speed and the second speed.*

*23. The apparatus of claim 22, wherein the control means is to rotate the tubular at the first speed of rotation for a first rotation cycle, the control means to rotate the tubular at the second speed of rotation for a second rotation cycle.*

*24. The apparatus of claim 22, wherein the analysis means is to decode the information based on a time period of the first rotation cycle relative to a time period of the second rotation cycle.*

*25. The apparatus of claim 23, wherein the sensor is to monitor at least one of a length of a time period at a frequency of the speed of rotation and the frequency of the speed of rotation.*

*26. The apparatus of claim 22, wherein the control means is to rotate the tubular at a third speed of rotation for a third rotation cycle, wherein the third rotation cycle is between the first rotation cycle and the second rotation cycle.*

*27. The apparatus of claim 26, wherein the analysis means is to decode the information based on a time period of the first*

*rotation cycle, a time period of the second rotation cycle and a time period of the third rotation cycle.*

*28. The apparatus of claim 21, wherein the control means is to rotate the tubular at different speeds across a number of rotation cycles, wherein one or more of the first of the number of rotation cycles is a preparatory data sequence, wherein one or more of the number of rotation cycles after the preparatory data sequence is representative of a magnitude value of a parameter to be altered downhole.*

*29. The apparatus of claim 21, wherein an emitter is positioned on the rotating part and is to emit a field, and wherein the sensor is to monitor the speed of rotation based on the field from the emitter.*

*30. The apparatus of claim 29, wherein the emitter comprises a magnet and the field comprises a magnetic field.*

*31. The apparatus of claim 21, wherein the information represents a parameter that is to be adjusted downhole.*

*32. An apparatus comprising:*

*a directional steering tool to control drilling direction downhole, the directional steering tool comprising,*

*a non-rotating part;*

*a rotating part coupled, by a tubular, to a control means at a surface of the Earth and to a drill bit downhole, wherein the control means communicates information downhole based on rotation of the rotating part at a first speed and at a second speed, wherein the first speed and the second speed are non-zero;*

*a sensor located on at least one of the non-rotating part and the rotating part to monitor rotation of the rotating part relative to the non-rotating part; and*

*an analysis means to decode the information based on the first speed and the second speed of rotation of the rotating part relative to the non-rotating part to control a steering parameter of the drill bit.*

*33. The apparatus of claim 32, wherein the directional steering tool further comprises a drive means to alter a parameter downhole based on the decoded information.*

*34. The apparatus of claim 32, wherein the steering parameter comprises a drilling direction of the drill bit.*

*35. The apparatus of claim 32, wherein the control means is to rotate the directional steering tool at the first speed of rotation for at least a first rotation cycle, the control means to rotate the directional steering tool at the second speed of rotation for at least a second rotation cycle, wherein the first speed of rotation and the second speed of rotation are above a threshold value.*

*36. The apparatus of claim 35, wherein the analysis means is to decode the information based on a time period of the first rotation cycle relative to a time period of the second rotation cycle.*

*37. A method comprising:*

*communicating information, from a surface of the Earth to downhole, along a tubular that is coupled to a rotating part that is part of a downhole tool, based on rotation of the tubular at a first speed and a second speed, wherein the first speed and the second speed are non-zero;*

*sensing the first speed and the second speed of rotation downhole through reference to a generally non-rotating part of the downhole tool; and*

*decoding the sensed first speed and the second speed into the information.*

*38. The method of claim 37, wherein the communicating of the information comprises:*

*rotating the tubular at the first speed of rotation for a first rotation cycle, wherein the first speed of rotation is above a threshold value; and*

*rotating the tubular at a second speed of rotation for a second rotation cycle, wherein the second speed of rotation is above a threshold value.*

*39. The method of claim 38, wherein the decoding comprises decoding the information based on a time period of the first rotation cycle relative to a time period of the second rotation cycle.*

*40. The method of claim 37, wherein decoding information comprises decoding the information using code correction.*

*41. A method comprising:*

*receiving control information for transmitting information downhole based on rotation of a first portion of a downhole tool relative to a generally non-rotating portion of the downhole tool; and*

*transmitting the information downhole based on the control information by rotating the tubular at a first speed for a first time period and a second speed for a second time period, wherein the first speed and the second speed are non-zero.*

*42. The method of claim 41, wherein transmitting the information comprises transmitting the information for altering a drilling direction of a drill bit coupled to the downhole tool.*

*43. The method of claim 37, wherein the sensing is performed through use of a sensor and an emitter, and wherein one of the sensor and emitter is coupled to the rotating part of the downhole tool, and wherein the other of the sensor and emitter is coupled to the non-rotating part of the downhole tool.*

*44. The method of claim 41, wherein the receiving of control information is performed through use of a sensor and an emitter, and wherein one of the sensor and emitter is coupled to the first part of the downhole tool, and wherein the other of the sensor and emitter is coupled to the non-rotating portion of the downhole tool.*

* * * * *